US012572426B2

(12) United States Patent
Jiang et al.

(10) Patent No.: US 12,572,426 B2
(45) Date of Patent: Mar. 10, 2026

(54) DATA BACKUP METHOD, DATA BACKUP DEVICE, AND COMPUTER PROGRAM PRODUCT

(71) Applicant: DELL PRODUCTS L.P., Round Rock, TX (US)

(72) Inventors: Changxu Jiang, Chengdu (CN); Fei Wang, Chengdu (CN); Pan Xiao, Chengdu (CN)

(73) Assignee: DELL PRODUCTS L.P., Round Rock, TX (US)

( * ) Notice: Subject to any disclaimer, the term of this patent is extended or adjusted under 35 U.S.C. 154(b) by 136 days.

(21) Appl. No.: 17/824,228

(22) Filed: May 25, 2022

(65) Prior Publication Data

US 2023/0333938 A1      Oct. 19, 2023

(30) Foreign Application Priority Data

Apr. 15, 2022    (CN) .......................... 202210399225.3

(51) Int. Cl.
| | |
|---|---|
| *G06F 11/14* | (2006.01) |
| *G06F 11/1446* | (2026.01) |
| *G06F 16/174* | (2019.01) |

(52) U.S. Cl.
CPC ...... *G06F 11/1451* (2013.01); *G06F 11/1466* (2013.01); *G06F 16/1756* (2019.01)

(58) Field of Classification Search
None
See application file for complete search history.

(56) References Cited

U.S. PATENT DOCUMENTS

| | | | | |
|---|---|---|---|---|
| 8,346,731 B1 * | 1/2013 | Tsaur | .................. | G06F 11/1458 707/673 |
| 9,952,933 B1 * | 4/2018 | Zhang | ................... | G06F 16/245 |
| 10,846,301 B1 * | 11/2020 | Jia | ........................... | G06F 17/18 |
| 2008/0256326 A1 * | 10/2008 | Patterson | ............ | G06F 16/1727 711/E12.001 |
| 2014/0095439 A1 * | 4/2014 | Ram | ....................... | G06F 3/067 707/640 |
| 2017/0351715 A1 * | 12/2017 | Cudak | ................. | G06F 11/3419 |
| 2018/0107402 A1 * | 4/2018 | Pogosyan | ........... | G06F 11/1448 |
| 2019/0034450 A1 * | 1/2019 | Dangi | ................. | G06F 16/1748 |

* cited by examiner

*Primary Examiner* — Jared I Rutz
*Assistant Examiner* — Alexander J Yoon
(74) *Attorney, Agent, or Firm* — WOMBLE BOND DICKINSON (US) LLP

(57) ABSTRACT

Embodiments of the present disclosure relate to a data backup method, a data backup device, and a computer program product. The method includes: determining delta data based on previous data and current data of a storage system; determining a delta data block subset in a delta data block set; sending delta index information and delta reference information associated with delta data blocks in the delta data block subset to a backup storage system; and sending, to the backup storage system, a further delta data block subset including delta data blocks in the delta data block set other than the delta data block subset. With the technical solution of the present disclosure, the amount of data transmission, the amount of computation, and the usage of a processing unit and a memory when backing up data can be reduced.

20 Claims, 6 Drawing Sheets

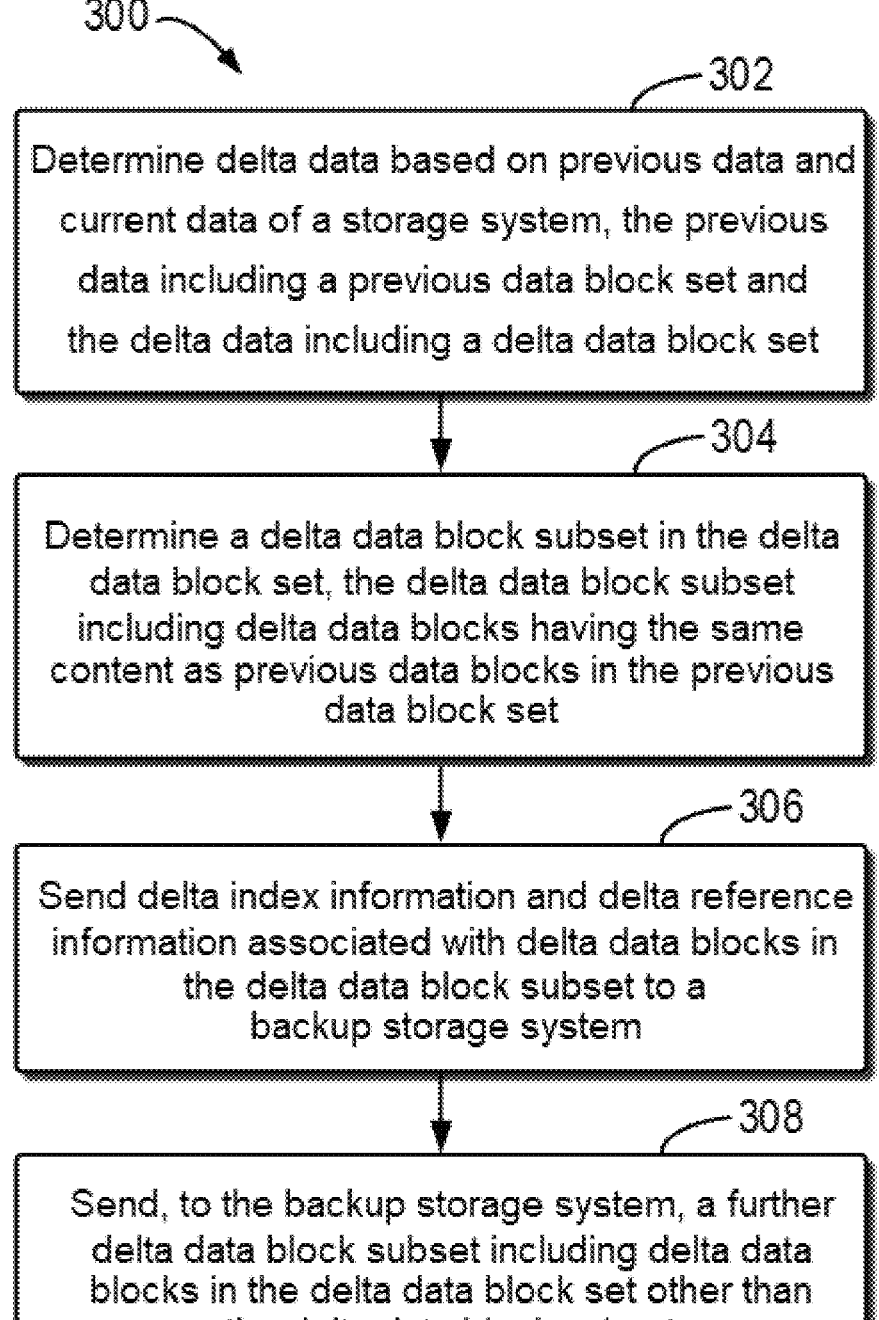

300

302

Determine delta data based on previous data and current data of a storage system, the previous data including a previous data block set and the delta data including a delta data block set

304

Determine a delta data block subset in the delta data block set, the delta data block subset including delta data blocks having the same content as previous data blocks in the previous data block set

306

Send delta index information and delta reference information associated with delta data blocks in the delta data block subset to a backup storage system

308

Send, to the backup storage system, a further delta data block subset including delta data blocks in the delta data block set other than the delta data block subset

FIG. 3

400

402

Receive delta index information and delta reference information associated with delta data blocks in a delta data block subset from a storage system, the delta data including a delta data block set, the delta data block set including the delta data block subset, the delta data being determined based on previous data and current data of the storage system, the previous data including a previous data block set, and the delta data blocks having the same content as previous data blocks in the previous data block set

404

Receive a further delta data block subset including delta data blocks in the delta data block set other than the delta data block subset from the storage system

FIG. 4

DATA BACKUP METHOD, DATA BACKUP DEVICE, AND COMPUTER PROGRAM PRODUCT

CROSS-REFERENCE TO RELATED APPLICATION

This patent application claims priority, under 35 U.S.C. § 119, of Chinese Patent Application No. 202210399225.3, filed Apr. 15, 2022, which is incorporated by reference in its entirety.

TECHNICAL FIELD

Embodiments of the present disclosure generally relate to the field of data protection, and particularly, to a data backup method, a data backup device, and a computer program product.

BACKGROUND

Data protection products mainly protect stored data of users by means of, for example, master-slave replication or backup, such that the stored data of users may be recovered through previously generated backup data when user data is unavailable due to hardware or software problems. Therefore, data protection functions such as replication and backup are very important for storage products. Asynchronous replication may be implemented by transmitting delta data within each recovery point objective (RPO) time with an RPO.

However, traditional asynchronous backup functions have high limitations. In particular, the traditional asynchronous backup functions are required to transmit a large amount of data when backing up data, and are required to perform a relatively large amount of computation. Therefore, processing unit and memory resources may be greatly used, thereby resulting in high cost when performing a backup operation, and bringing a poor experience for users.

SUMMARY OF THE INVENTION

Embodiments of the present disclosure provide a data backup method, a data backup device, and a computer program product.

In a first aspect of the present disclosure, a data backup method is provided. The method includes: determining delta data based on previous data and current data of a storage system, the previous data including a previous data block set and the delta data including a delta data block set; determining a delta data block subset in the delta data block set, the delta data block subset including delta data blocks having the same content as previous data blocks in the previous data block set; sending delta index information and delta reference information associated with delta data blocks in the delta data block subset to a backup storage system; and sending, to the backup storage system, a further delta data block subset including delta data blocks in the delta data block set other than the delta data block subset.

In a second aspect of the present disclosure, a data backup method is provided. The method includes: receiving delta index information and delta reference information associated with delta data blocks in a delta data block subset from a storage system, the delta data including a delta data block set, the delta data block set including the delta data block subset, the delta data being determined based on previous data and current data of the storage system, the previous data including a previous data block set, and the delta data blocks having the same content as previous data blocks in the previous data block set; and receiving a further delta data block subset including delta data blocks in the delta data block set other than the delta data block subset from the storage system.

In a third aspect of the present disclosure, a data backup device is provided. The device includes: at least one processing unit; and at least one memory coupled to the at least one processing unit and storing instructions for execution by the at least one processing unit, wherein the instructions, when executed by the at least one processing unit, cause the device to perform actions including: determining delta data based on previous data and current data of a storage system, the previous data including a previous data block set and the delta data including a delta data block set; determining a delta data block subset in the delta data block set, the delta data block subset including delta data blocks having the same content as previous data blocks in the previous data block set; sending delta index information and delta reference information associated with delta data blocks in the delta data block subset to a backup storage system; and sending, to the backup storage system, a further delta data block subset including delta data blocks in the delta data block set other than the delta data block subset.

In a fourth aspect of the present disclosure, a data backup device is provided. The device includes: at least one processing unit; and at least one memory coupled to the at least one processing unit and storing instructions for execution by the at least one processing unit, wherein the instructions, when executed by the at least one processing unit, cause the device to perform actions including: receiving delta index information and delta reference information associated with delta data blocks in a delta data block subset from a storage system, the delta data including a delta data block set, the delta data block set including the delta data block subset, the delta data being determined based on previous data and current data of the storage system, the previous data including a previous data block set, and the delta data blocks having the same content as previous data blocks in the previous data block set; and receiving a further delta data block subset including delta data blocks in the delta data block set other than the delta data block subset from the storage system.

In a fifth aspect of the present disclosure, a computer program product is provided. The computer program product is tangibly stored on a non-transitory computer-readable medium and includes machine-executable instructions. The machine-executable instructions, when executed, cause a machine to perform any step of the method described according to the first aspect of the present disclosure.

In a sixth aspect of the present disclosure, a computer program product is provided. The computer program product is tangibly stored on a non-transitory computer-readable medium and includes machine-executable instructions that, when executed, cause a machine to perform any step of the method described according to the second aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

FIG. 3 shows a flow chart of data backup method 300 according to an embodiment of the present disclosure;

FIG. 4 shows a flow chart of data backup method 400 according to an embodiment of the present disclosure;

In the figures, identical or corresponding numerals represent identical or corresponding parts.

DETAILED DESCRIPTION

Figure 1:
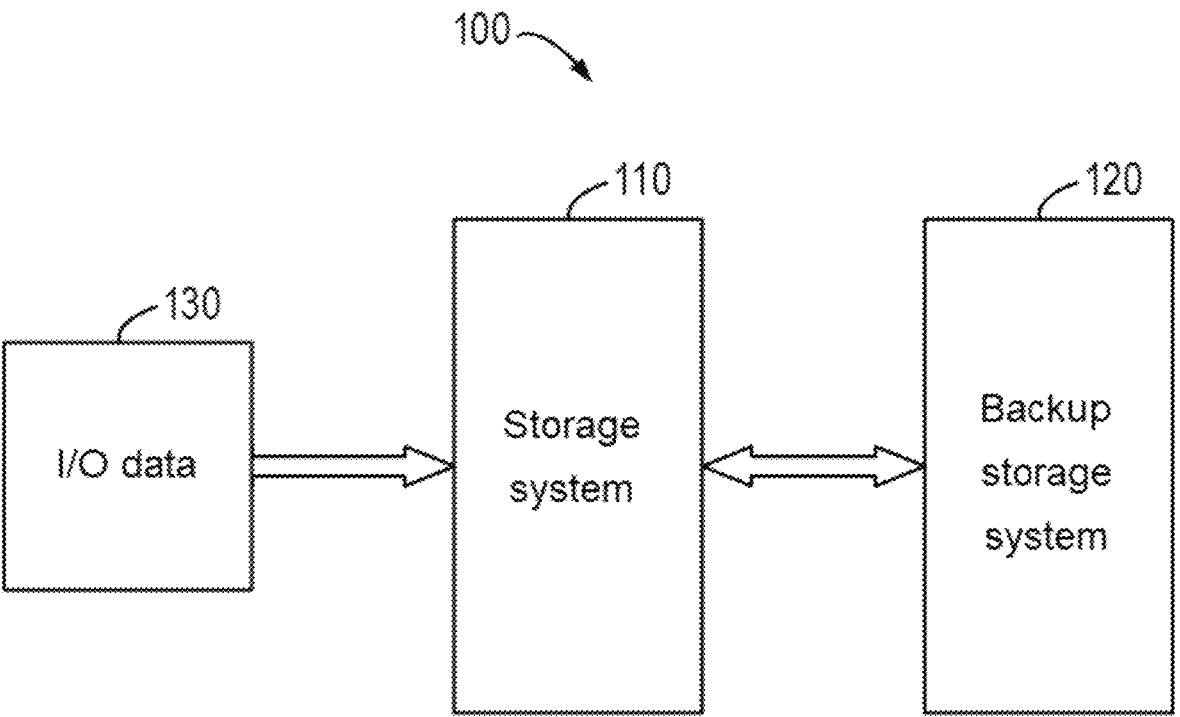
FIG. 1 shows a schematic diagram of data backup environment 100 in which a data backup method in some embodiments of the present disclosure may be implemented.

Preferred embodiments of the present disclosure will be described in more detail below with reference to the accompanying drawings. Although preferred embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above in the Background, traditional asynchronous backup functions have high limitations. In particular, the traditional asynchronous backup functions are required to transmit a large amount of data when backing up data, and are required to perform a relatively large amount of computation. Therefore, processing unit and memory resources may be greatly used, thereby resulting in high cost when performing a backup operation, and bringing a poor experience for users.

Specifically, delta data backup is employed in traditional method. Upon the first completion of an initial copy stage, a source storage system and a destination storage system will have the same internal snapshot as a "common base" and the session state between them is "synchronized." Specifically, the common basis is a snapshot of time points of both parties in the same state. For example, when a file system needs to be backed up, both the source storage system and the destination storage system will be synchronized with the snapshot of the file system at an initial time.

When an RPO time expires, the source storage system will take another snapshot of the file system, delta data may be determined from the previous snapshot and the current snapshot, and data backup may be implemented by transmitting only delta data to the destination storage system.

However, customers always want to shorten RPOs to ensure that the data is protected or backed up as soon as possible. Traditional forms of backup may not care about how much storage space is used in the process. But today, storage space may face unique challenges as backup demands are increasing.

On the one hand, destination storage devices set by most customers are low-performing, have a low writing speed, and are mainly used for backup, thereby resulting in long synchronization time.

On the other hand, since a large amount of data is generated, too many data copies are transferred from a storage system as a source storage device to a backup storage system as a destination storage device for backup, but this is unwise and increases network traffic. In addition, it is not applicable for low-end target systems/clusters to have inline data de-duplication functionality and maintain a huge data de-duplication cache table for storing index information which may be referred to as footprints or identifiers.

Further, some backup products divide backup data into sub-file segments of a variable length and apply a unique hash identifier to each segment during the backup process. This mode performs global duplicate data elimination at a file level, but fails to take advantage of the most detected delta data pattern in delta data, where the data pattern is a piece of data with the fixed content and may be referred to as a data block. In addition, these file segments cannot be divided too small, because as the total number of segments is increased, the number of hash identifiers is also increased, thereby prolonging the search time for a hash table, which is even worse when the system is a low-end system.

Specifically, customers may want a shorter RPO, but the synchronization process is very time consuming. Asynchronous replication is a frequently-used data protection technology for users to set an RPO for a replication session. The RPO is an industry recognized term, which represents an acceptable amount of data that may be lost in a failure, measured in time. Asynchronous replication of the RPO is implemented by transmitting delta data within each RPO time, where data transmission occurs within each RPO time window.

However, if the data transmission cannot be completed within the RPO time, it means that the service requirements for data protection cannot be met.

In a real customer scenario, a customer will often configure hundreds of asynchronous replication sessions, where an RPO is set to 5 to 10 minutes. In current implementations of asynchronous replication, a later synchronization process will only begin after the previous synchronization process of a session has been completed. This means that for any replication session, the purpose of data protection cannot be achieved when the synchronization process runs beyond the RPO time.

In addition, one of the deficiencies in achieving a shorter RPO is that the destination storage device is often a device having a lower performance and adopting a lower writing speed pattern because the device is used mainly for backup. Customers typically set up a primary source storage device which is more expensive and higher in performance. The device may be an all-flash storage device with rich functions of data compression, duplicate data deletion, etc. Also, in view of cost savings, the destination storage device is typically a low-end model that has a low writing speed and does not have a data reduction function, which is mainly for disaster recovery or backup. The configuration of the destination device prolongs the synchronization time, such that it is difficult to set a shorter RPO.

Further, as the amount of data is increased, too many data copies are transferred from the source storage device to the destination storage device for backup, network traffic is increased, and current implementations are undesirable.

In an existing data replication solution that uses data de-duplication, if data de-duplication is not enabled by the destination storage device, the data will be completely replicated to a destination storage resource pool. For low-end target systems, it is not applicable to implement inline data de-duplication by maintaining a large data de-duplication cache table which is identical to that of the source system.

In order to solve, at least in part, one or more of the above-mentioned problems, as well as other potential problems, embodiments of the present disclosure propose a delta data storage and retrieval method, which may be referred to as "adaptive pattern synchronization and mapping." The method is particularly applicable to replication and backup scenarios. The method advances a data synchronization process from the primary source storage system to the destination storage system. Particularly, the method considers that inline data de-duplication functionality is not applicable to the destination storage system, which is a low-end mixed storage system, reduces data transmitted to the destination storage system, and reduces data that needs to be written to a physical drive of the destination storage system.

In order to solve, at least in part, one or more of the above problems and other potential problems, embodiments of the present disclosure propose a method for applying a compliance (backup requirements) driven data protection life cycle in a data protection product. That is, a user only needs to provide backup requirements without specifying a backup strategy (backup operation). The system may automatically determine the backup strategy, and may then optimize the backup strategy or perform additional operations. In this way, it is not only possible to automatically generate a backup strategy that can meet the backup requirements of users, but also to simplify the configuration process and improve the user experience.

FIG. 1 shows a schematic diagram of data backup environment 100 in which a data backup method in some embodiments of the present disclosure may be implemented. Data backup environment 100 includes storage system 110 and backup storage system 120, where storage system 110 may receive input/output (I/O) data 130 for backup. As previously described, I/O data 130 may include a file system and may include any form of data that requires an RPO backup. The double-headed arrow between storage system 110 and backup storage system 120 indicates that storage system 110 may back up data to backup storage system 120 and may recover data from backup storage system 120 as needed.

It should be noted that data backup environment 100 is scalable, which may include more storage systems 110 and backup storage systems 120, and may even include more I/O data 130, such that the requirements for more users to perform data backup simultaneously can be met. For simplicity of illustration, only one storage system 110, one backup storage system 120, and one piece of I/O data 130 are shown in FIG. 1.

Figure 2:
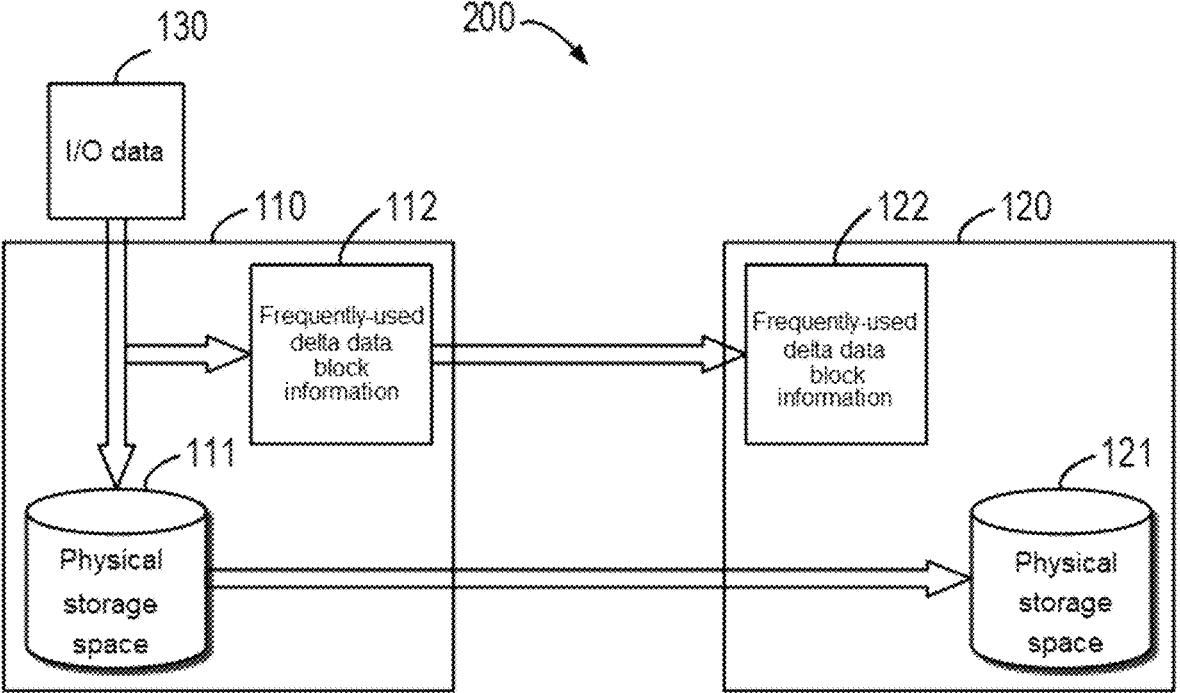
FIG. 2 shows a schematic diagram of data backup environment 200 in which a data backup method in some embodiments of the present disclosure may be implemented.

FIG. 2 shows a schematic diagram of data backup environment 200 in which a data backup method in some embodiments of the present disclosure may be implemented. Data backup environment 200 also includes storage system 110, backup storage system 120, and I/O data 130, but storage system 110 includes physical storage space 111 and frequently-used delta data block information 112, and backup storage system 120 includes physical storage space 121 and frequently-used delta data block information 122.

As shown in FIG. 2, after I/O data 130 is input into storage system 110, the data is stored in physical storage space 111, and frequently-used delta data block information 112 may be generated from I/O data 130 received at one or more times. According to embodiments of the present disclosure, delta data may be determined based on I/O data 130 received at two times, which may be referred to as previous data and current data, and input to storage system 110. The delta data may be divided into delta data blocks of the same or different sizes, and the same delta data block may exist in I/O data 130 received at one time or in I/O data 130 received at multiple times. Storage system 110 may count different delta data blocks in I/O data 130 received at multiple times and may thereby determine frequently-used delta data blocks and then generate frequently-used delta data block information 112.

Frequently-used delta data block information 112 may include index information for frequently-used delta data blocks, and the index information may be obtained, for example, by an algorithm such as SHA256. Implementation of obtaining the index information for the frequently-used delta data blocks is not limited in the present disclosure as long as it can generate different index information for different frequently-used delta data blocks.

Frequently-used delta data block information 112 generated by storage system 110 may be transmitted to backup storage system 120 and stored in backup storage system 120 as frequently-used delta data block information 122. According to some embodiments of the present disclosure, frequently-used delta data block information 112 and frequently-used delta data block information 122 are the same. According to other embodiments of the present disclosure, frequently-used delta data block information 112 and frequently-used delta data block information 122 may also be different depending on respective operations performed by storage system 110 and backup storage system 120.

In addition, frequently-used delta data block information 112 and frequently-used delta data block information 122 may change as I/O data 130 continues to be input into storage system 110, and thus entries for frequently-used delta data blocks are increased or decreased.

Data from I/O data 130 stored in physical storage space 111 may be transmitted to backup storage system 120 and stored in physical storage space 121. According to some embodiments of the present disclosure, data from I/O data 130 is transmitted entirely from storage system 110 to backup storage system 120. According to other embodiments of the present disclosure, because data from I/O data 130 may include data blocks with the same content, storage system 110 may only transmit data blocks with differences to backup storage system 120, as well as information on how to form original data using the data blocks with differences, thereby reducing the amount of data content that needs to be transmitted to backup storage system 120.

FIG. 3 shows a flow chart of data backup method 300 according to an embodiment of the present disclosure. Data backup method 300 may be implemented in data backup environment 100 and data backup environment 200. Specifically, data backup method 300 may be implemented by storage system 110 shown in FIG. 1 or FIG. 2, or by other appropriate devices. It should be understood that data backup method 300 may also include additional steps not shown and/or may omit the steps shown, and the scope of the embodiments of the present disclosure is not limited in this regard.

At block 302, storage system 110 determines delta data based on previous data and current data of storage system 110. According to some embodiments of the present disclosure, previous data and current data of storage system 110 may be formed by receiving I/O data 130. According to other embodiments of the present disclosure, previous data and current data of storage system 110 may also be used to reflect data changes of storage system 110.

According to embodiments of the present disclosure, the previous data includes a previous data block set containing previous data blocks of the same or different sizes, and the delta data includes a delta data block set containing delta data blocks of the same or different sizes.

At block 304, storage system 110 determines a delta data block subset in the delta data block set. The delta data block subset includes delta data blocks having the same content as previous data blocks in the previous data block set. According to embodiments of the present disclosure, the delta data blocks included in the delta data block subset belong to frequently-used delta data blocks and thus may have the same content as the previous data blocks in the previous data block set.

According to embodiments of the present disclosure, when storage system 110 determines whether a certain delta data block in the delta data block set belongs to frequently-used delta data blocks, storage system 110 may determine that the delta data block belongs to frequently-used delta data blocks, i.e., determine that the delta data block as a delta data block in the delta data block subset, based on the number of previous data blocks in the previous data block set which have the same content as the delta data block.

According to embodiments of the present disclosure, since the previous data block set may include complete previous data and may include identical previous data blocks, one delta data block in the delta data block subset may have the same content as a plurality of previous data blocks in the previous data block set.

At block 306, storage system 110 sends delta index information and delta reference information associated with delta data blocks in the delta data block subset to backup storage system 120. According to embodiments of the present disclosure, since the delta data blocks in the delta data block subset belong to frequently-used delta data blocks and these frequently-used delta data blocks have been sent to backup storage system 120, for the purpose of reducing data transmission, there is no need to send these delta data blocks belonging to frequently-used delta data blocks to backup storage system 120 for this delta data, and only delta index information and delta reference information associated with these delta data blocks can be sent to backup storage system 120.

According to embodiments of the present disclosure, delta index information associated with a delta data block may be obtained as previously described, for example, by an SHA256 algorithm. In addition, delta reference information may include, for example, the number and position of a certain delta data block in the delta data, such that backup storage system 120 may recover the delta data based on the same stored data block as the delta data block based on the delta reference information. In addition, since the delta index information is obtained by storage system 110 and sent to backup storage system 120, backup storage system

120 may directly use the delta index information without computing the delta index information.

At block 308, storage system 110 sends to backup storage system 120 a further delta data block subset including delta data blocks in the delta data block set other than the delta data block subset. According to embodiments of the present disclosure, as previously described, the delta data blocks in the delta data block subset belong to frequently-used delta data blocks and have been already sent to backup storage system 120, and delta data blocks in the delta data other than the delta data block subset have not previously been sent to backup storage system 120. Therefore, it is necessary to send these delta data blocks that have not been sent to backup storage system 120 to backup storage system 120, such that backup storage system 120 may completely recover the delta data.

According to embodiments of the present disclosure, storage system 110 may send delta index information associated with delta data blocks in the aforementioned other delta data block subset to the backup storage system. As previously described, storage system 110 may be a higher-performance storage system. Therefore, storage system 110 obtains delta index information for these delta data blocks that have not been previously sent to backup storage system 120 and sends the delta index information to backup storage system 120 such that backup storage system 120 may directly use the delta index information without computing the delta index information.

According to some embodiments of the present disclosure, when the aforementioned previous data is initial data of storage system 110, the initial data needs to be sent to backup storage system 120 since backup storage system 120 has never received the initial data. It should be understood that the initial data also includes an initial data block set. At this moment, storage system 110 sends the initial data block set and initial index information associated with initial data blocks in the initial data block set to the backup storage system. Storage system 110 obtains initial index information associated with the initial data blocks and sends the initial index information to backup storage system 120 such that backup storage system 120 may directly use the initial index information without computing the initial index information.

According to other embodiments of the present disclosure, storage system 110 may send an initial data block subset in the initial data block set and initial index information associated with initial data blocks in the initial data block subset to backup storage system 120. The initial data blocks in the initial data block subset have different contents. In addition, storage system 110 may also send initial reference information associated with data blocks having the same content in the initial data block set to backup storage system 120. At this moment, the amount of data that needs to be transmitted by storage system 110 to backup storage system 120 for the initial data can be reduced.

It should be understood that data backup method 300 has been described above with storage system 110 as the entity for performing the method. Accordingly, corresponding and further operations also need to be performed in backup storage system 120 according to other embodiments of the present disclosure, which will be described in detail below in connection with FIG. 4.

FIG. 4 shows a flow chart of data backup method 400 according to an embodiment of the present disclosure. Data backup method 400 may be implemented in data backup environment 100 and data backup environment 200. Specifically, data backup method 400 may be implemented by backup storage system 120 shown in FIG. 1 or FIG. 2, or by other appropriate devices. It should be understood that data backup method 400 may also include additional steps not shown and/or may omit the steps shown, and the scope of the embodiments of the present disclosure is not limited in this regard.

At block 402, backup storage system 120 receives delta index information and delta reference information associated with delta data blocks in a delta data block subset from storage system 110. According to embodiments of the present disclosure, corresponding to the above description regarding data backup method 300, delta data includes a delta data block set. The delta data block set includes a delta data block subset. The delta data is determined based on previous data and current data of storage system 110. The previous data includes a previous data block set, and delta data blocks have the same content as previous data blocks in the previous data block set.

At block 404, backup storage system 120 receives a further delta data block subset including delta data blocks in the delta data block set other than the delta data block subset from storage system 110. According to embodiments of the present disclosure, backup storage system 120 may also receive delta index information associated with delta data blocks in the further delta data block subset from the storage system.

According to embodiments of the present disclosure, upon receiving delta index information and delta reference information associated with the delta data blocks in the delta data block subset and a further delta data block subset including delta data blocks in the delta data block set other than the delta data block subset from storage system 110, backup storage system 120 may recover the delta data with such data and previously stored data when data needs to be recovered.

According to some embodiments of the present disclosure, when the aforementioned previous data is initial data of storage system 110, backup storage system 120 needs to receive the initial data since backup storage system 120 has never received the initial data. It should be understood that the initial data also includes an initial data block set. At this moment, backup storage system 120 may receive the initial data block set and initial index information associated with initial data blocks in the initial data block set from storage system 110.

According to other embodiments of the present disclosure, backup storage system 120 may receive an initial data block subset in the initial data block set and initial index information associated with initial data blocks in the initial data block subset from storage system 110. The initial data blocks in the initial data block subset have different contents. In addition, backup storage system 120 may also receive initial reference information associated with data blocks having the same content in the initial data block set from storage system 110. At this moment, the amount of data that needs to be received by backup storage system 120 from storage system 110 for the initial data can be reduced.

At this moment, backup storage system 120 generates backup data corresponding to the initial data based on the initial data block subset, the initial index information, and the initial reference information.

According to embodiments of the present disclosure, the index information is deleted if backup storage system 120 determines that data blocks in the storage system associated with index information in the delta index information and the initial index information are deleted for the purpose of reducing data stored in backup storage system 120. This may be referred to as a retention and expulsion mechanism.

According to embodiments of the present disclosure, backup storage system 120 may count references to delta data blocks. Specifically, backup storage system 120 may receive further delta index information associated with another delta data block in further delta data when the further delta data from storage system 110 needs to be backed up. Backup storage system 120 may then increase a count associated with the index information if determining that the further delta index information is the same as index information in the received delta index information and initial index information. According to these embodiments, backup storage system 120 may further learn which data blocks are more referenced.

Further, since multiple references to one data block may be included in one delta data block, backup storage system 120 may receive further delta reference information associated with a further delta data block and may increase a count associated with the index information based on the number of references to the further delta data block indicated by the further delta reference information.

According to embodiments of the present disclosure, the specific steps in data backup method 300 and data backup method 400 may be implemented in the form of tables such as look-up tables. These embodiments will be described in detail below in conjunction with FIGS. 5 and 6.

Figure 5:
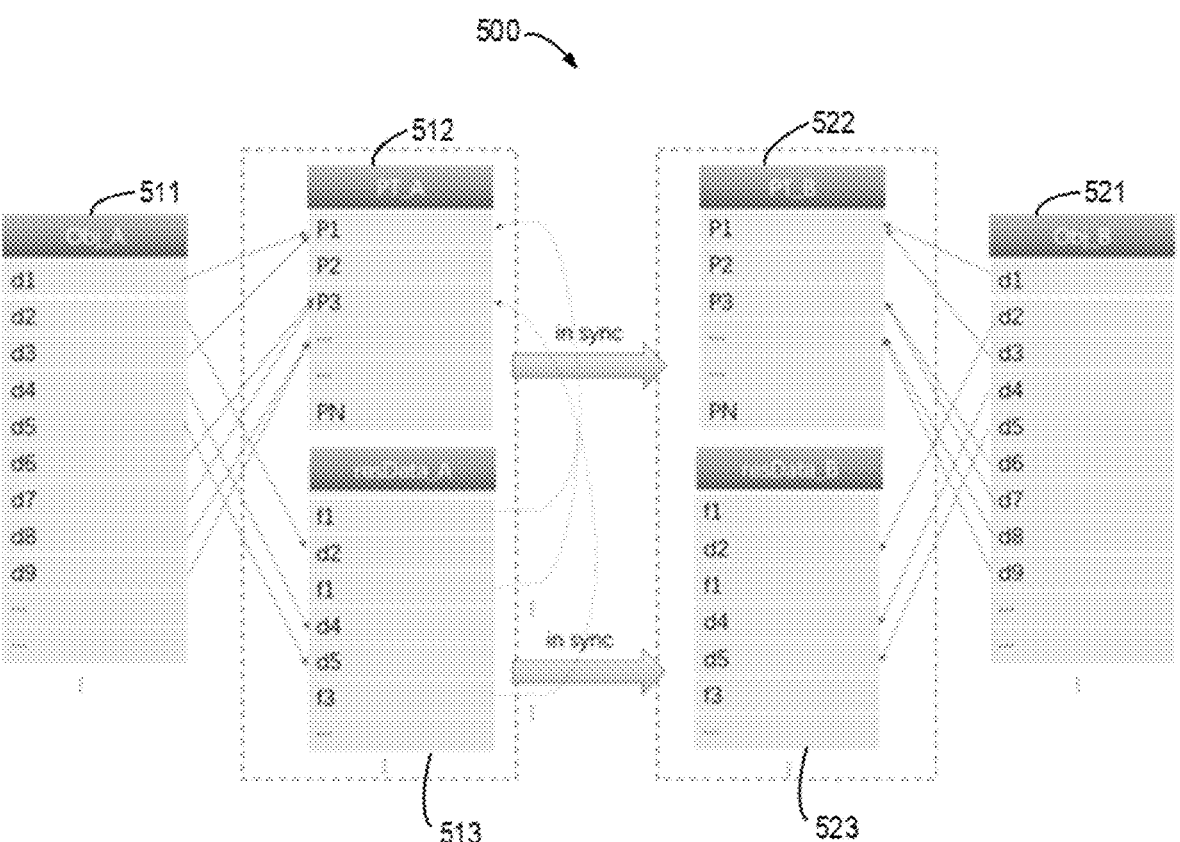
FIG. 5 shows schematic diagram 500 of initial data backup according to an embodiment of the present disclosure.

FIG. 5 shows schematic diagram 500 of initial data backup according to an embodiment of the present disclosure. In schematic diagram 500, initial data 511 in storage system 110 that may be identified as Obj_A, frequently-used delta data block set 512 that includes frequently-used delta data blocks and may be identified as PT_A, and payload data 513 that corresponds to initial data 511 and may be identified as resData_A are shown. Accordingly, in schematic diagram 500, initial data 521 in backup storage system 120 that may be identified as Obj_B, frequently-used delta data block set 522 that includes frequently-used delta data blocks and may be identified as PT_B, and payload data 523 that corresponds to initial data 521 and may be identified as resData_B are also shown.

As shown in FIG. 5, a plurality of items in frequently-used delta data block set 512 correspond to more than one item in initial data 511 respectively. Therefore, these items in frequently-used delta data block set 512 will be transmitted to backup storage system 120 as frequently-used delta data blocks. In addition, an arrowed item in payload data 513 indicates that the item is a non-frequently-used data block and therefore the data block is to be transmitted in payload data 513, while an item that is not arrowed in payload data 513 indicates that the item is a frequently-used data block and has been transmitted to backup storage system 120 in frequently-used delta data block set 512. Therefore, it is only necessary to note in payload data 513 that they are referenced.

As shown in FIG. 5, the corresponding relationship between initial data 521, frequently-used delta data block set 522 and payload data 523 in backup storage system 120 completely corresponds to the corresponding relationship between initial data 511, frequently-used delta data block set 512, and payload data 513, except that after receiving frequently-used delta data block set 512, and payload data 513 in backup storage system 120, data blocks therein are stored in a local storage, and therefore only address references to these data blocks are retained in the corresponding frequently-used delta data block set 522 and payload data 523.

According to some embodiments of the present disclosure, when storage system 110 generates frequently-used delta data block set 512 using initial data 511, an item may be transmitted to backup storage system 120 immediately upon being generated instead of being collectively transmitted to backup storage system 120 upon completion of the whole frequently-used delta data block set 512.

Figure 6:
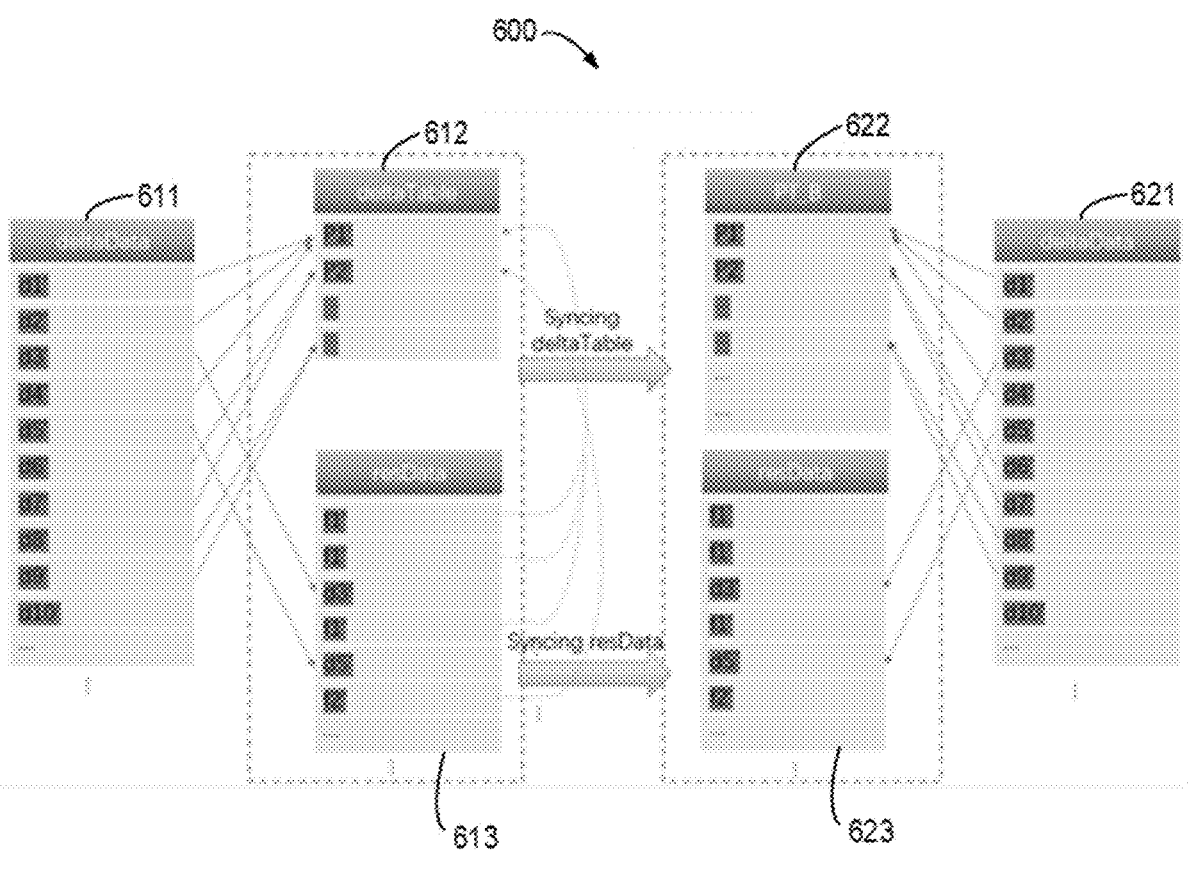
FIG. 6 shows schematic diagram 600 of delta data backup according to an embodiment of the present disclosure.

FIG. 6 shows schematic diagram 600 of delta data backup according to an embodiment of the present disclosure. In schematic diagram 600, delta data 611 in storage system 110 that may be identified as deltaData, frequently-used delta data block set 612 that includes frequently-used delta data blocks for delta data 611 and may be identified as deltaTable, and payload data 613 that corresponds to delta data 611 and may be identified as resData are shown. In schematic diagram 600, delta data 621 in backup storage system 120 that may be identified as deltaData, frequently-used delta data block set 622 that includes frequently-used delta data blocks and may be identified as PT_B, and payload data 623 that corresponds to delta data 621 and may be identified as resData are also shown.

As shown in FIG. 6, a plurality of items in frequently-used delta data block set 612 correspond to more than one item in delta data 611 respectively. Therefore, these items in frequently-used delta data block set 612 will be transmitted to backup storage system 120 as frequently-used delta data blocks. In addition, an arrowed item in payload data 613 indicates that the item is a non-frequently-used data block and therefore the data block is to be transmitted in payload data 613, while an item in payload data 613 that is not arrowed indicates that the item is a frequently-used data block and has been transmitted to backup storage system 120 in frequently-used delta data block set 612. Therefore, it is only necessary to note in payload data 613 that they are referenced.

As shown in FIG. 6, the corresponding relationship between delta data 621, frequently-used delta data block set 622, and payload data 623 in backup storage system 120 is very similar to the corresponding relationship between delta data 611, frequently-used delta data block set 612, and payload data 613, except that frequently-used delta data block set 622 not only includes frequently-used delta data blocks only for delta data 611 as included in frequently-used delta data block set 612, but also includes frequently-used delta data blocks for all data received so far from storage system 110, and after receiving frequently-used delta data block set 612 and payload data 613 in backup storage system 120, data blocks therein are stored in a local storage. Therefore, only address references to these data blocks are retained in the corresponding frequently-used delta data block set 622 and payload data 623.

According to some embodiments of the present disclosure, when storage system 110 generates frequently-used delta data block set 612 using delta data 611, an item may be transmitted to backup storage system 120 immediately upon being generated instead of being collectively transmitted to backup storage system 120 upon completion of the whole frequently-used delta data block set 612.

Referring to FIGS. 5 and 6, the technical solution according to embodiments of the present disclosure has the following features:

Instead of synchronizing a huge global cache table to backup storage system 120, storage system 110 identifies the most frequently detected delta data blocks on each RPO as a frequently-used delta data block set that will be recreated on each RPO and transmitted to backup storage system 120.

Storage system 110 generates payload data 613 and transmits the payload data to backup storage system 120 at each RPO, where delta data blocks that match any entry in the delta table will mark index information only when a payload is created for transmission.

Instead of maintaining a huge global table, backup storage system 120 updates PT_B according to the delta table when the RPO arrives, and uses an optimized retention and expulsion mechanism to limit data entries in PT_B such that the most frequently matched entries that contribute the most in terms of saving space and delta data transmission can be retained, but the usage of a processing unit and a memory in searching tables can be greatly reduced.

Since entries already exist in PT_B, backup storage system 120 performs data de-duplication for entries marked in resData, and duplicate data will not be written into a physical space, thereby further saving a target storage space.

It is contemplated that the most frequently written data patterns on storage system 110 should also be the most frequently written data patterns on backup storage system 120. The technical solutions according to embodiments of the present disclosure will utilize data blocks most frequently detected by a source resource on storage system 110. This would provide a significant benefit if storage system 110 has a data reduction module to compute data block identifiers. As identifiers for data de-duplication patterns could be reused, there is no need for additional identifier computation costs.

In addition, the following is a summary of FIGS. 5 and 6.

Obj_A is a source resource object on storage system 110.

Obj_B is a target resource object on backup storage system 120.

PT_A is a frequently-used delta data block table on storage system 110, which reflects delta data blocks that are most frequently encountered by Obj_A/subjected to data de-duplication, and is generated as part of the transmitted data payload upon initial replication.

PT_B is a frequently-used delta data block table maintained on backup storage system 120, is initially created according to PT_A, and is updated according to the frequently-used delta data block table when an RPO arrives.

resData_A is a data payload with a virtual mapping data structure, which is transmitted to backup storage system 120 to generate resData_B.

resData_B is a virtual data structure maintained on backup storage system 120 for storing and retrieving data of Obj_B.

deltaTable reflects a frequently-used delta data block table of data blocks to which delta data is most frequently written, and is generated when each synchronization point firstly transmits data load to backup storage system 120 and performs synchronization.

resData is a data payload with a virtual mapping data structure, which is transmitted to backup storage system 120 during each synchronization and is available to generate delta data.

In addition, according to some embodiments of the present disclosure, relational mapping F_M may also be included in FIGS. 5 and 6 for data storage and retrieval. Relational mapping F_M enables the virtualization and creation of the frequently-used delta data block table and delta table PT_A.

For source Obj_A at storage system 110, a data de-duplication IO pattern (RPO) over a period of time may be reflected by tracking the number of identifier hits of a data de-duplication module of the storage system. Relational mapping F_M is generated by a data reduction module using a pattern identifier, and therefore no additional fingerprint computation is needed. Relational mapping F_M may be used to create PT_A and a frequently-used delta data block table.

Specifically, each entry in relational mapping F_M may include generated index information, a position pointer for frequently-used delta data blocks, and the number of references to frequently-used delta data blocks, which may be referred to as the number of hits.

When relationship mapping F_M is created, for a piece of index information, it may be searched first whether the index information exists in relationship mapping F_M. If not, corresponding entries are added in relational mapping F_M, a position pointer associated with this piece of index information is updated by query, and the number of hits is increased. If yes, it is further determined whether a position pointer exists. If so, the number of hits is directly increased. Otherwise a position pointer associated with this piece of index information is updated by query and the number of hits is increased.

When frequently-used delta data block set 512 including frequently-used delta data blocks for initial data 511 is created, relational mapping F_M is firstly simplified by deleting items having the number of hits less than a minimum hit threshold, and then the entries in relational mapping F_M are sorted by the number of clicks. The first N items with the highest number of hits are selected as candidate items of PT_A. If an actual number K of items is less than N, all the K items will be selected. For each item n of PT_A, Pn=[fi, dataChunki]. Upon completion of PT_A creation using relational mapping F_M, relational mapping F_M may be removed.

According to the illustration in FIG. 5, upon initialization for frequently-used delta data block set 522, which may be identified as PT_B, if an entry from frequently-used delta data block set 512 transmitted from storage system 110, which may be identified as PT_A, does not exist in frequently-used delta data block set 522, the entry includes actual data. At this moment, the data of the entry will be written to initial data 521, a corresponding item is added to frequently-used delta data block set 522, and a count for the entry may be increased. If the entry exists in frequently-used delta data block set 522, it is further determined whether a position pointer exists. If the position pointer also exists, delta reference information is added. If the position pointer does not exist, the data of the entry will be written to initial data 521, a corresponding entry is added to frequently-used delta data block set 522, and a count for the entry may be increased. At this moment, each entry in frequently-used delta data block set 522, which may be identified as PT_B, may include generated index information, a position pointer for frequently-used delta data blocks, and the number of references to frequently-used delta data blocks, which may be referred to as the number of hits.

According to the illustration in FIG. 5, when payload data 513 sent by storage system 110 that may be identified as resData_A is determined at backup storage system 120, it may be determined for each entry therein whether it is index information or actual data. If it is actual data, the data of the entry may be written to initial data 521. If it is index information, a count for the entry may be increased, and a position pointer thereof may be used to obtain corresponding data blocks from initial data 521.

The correspondence with respect to FIG. 6 is substantially the same as that described above with respect to FIG. 5, and detailed descriptions thereof are omitted herein.

The related contents of data backup environment 100 in which the data backup method in some embodiments of the present disclosure may be implemented, data backup environment 200 in which the data backup method in some embodiments of the present disclosure may be implemented, data backup method 300 according to embodiments of the present disclosure, data backup method 400 according to embodiments of the present disclosure, initial data backup according to embodiments of the present disclosure, and delta data backup according to embodiments of the present disclosure are described above with reference to FIGS. 1-6. It should be understood that the above description is to better demonstrate the content recorded in the present disclosure, and is not intended to limit the present disclosure in any way.

It should be understood that the numbers of various elements and the magnitudes of physical quantities used in the various drawings of the present disclosure are only examples, and are not intended to limit the protection scope of the present disclosure. The above numbers and magnitudes may be arbitrarily set as needed without affecting the normal implementation of the embodiments of the present disclosure.

Through the above description with reference to FIGS. 1 to 6, the technical solutions according to the embodiments of the present disclosure have many advantages over the conventional solution. For example, the technical solution according to embodiments of the present disclosure, as a new data storage and retrieval method for replication and backup usage scenarios, achieves the goal of reducing data transmitted to a destination storage system and data written to a physical drive of the destination storage system on the destination storage system with much lower processing unit and memory requirements, which is very advantageous for a low-end destination storage system to perform lightweight embedded pattern data de-duplication on delta data.

In addition, unlike existing methods, the technical solution according to embodiments of the present disclosure utilizes the most frequently detected delta data patterns on a source storage system to reduce data transmitted to the destination storage system. The destination storage system only needs to maintain a lightweight table with a frequent matching pattern that contributes the most in terms of saving space and delta data transmission, which can significantly reduce the usage of a processing unit and a memory in lookup tables. Meanwhile, the destination storage system does not need to compute index information for delta data blocks, which may be referred to as fingerprints or identifiers, since this index information is transmitted from the source storage system.

Further, when the destination storage system has no other inline data de-duplication functionality, since it is not suitable for a low-end destination storage system/cluster to have inline data de-duplication functionality and maintain a huge data de-duplication cache table to store space, the method reduces data blocks stored on the destination storage system, such that the new data mapping extraction further helps to improve the storage efficiency.

Again, the technical solution according to embodiments of the present disclosure may also work with other file level data de-duplication to provide frequently-used delta data block level data de-duplication as a complement. It is especially efficient when the destination storage system or cluster is a low-end system or cluster.

Figure 7:
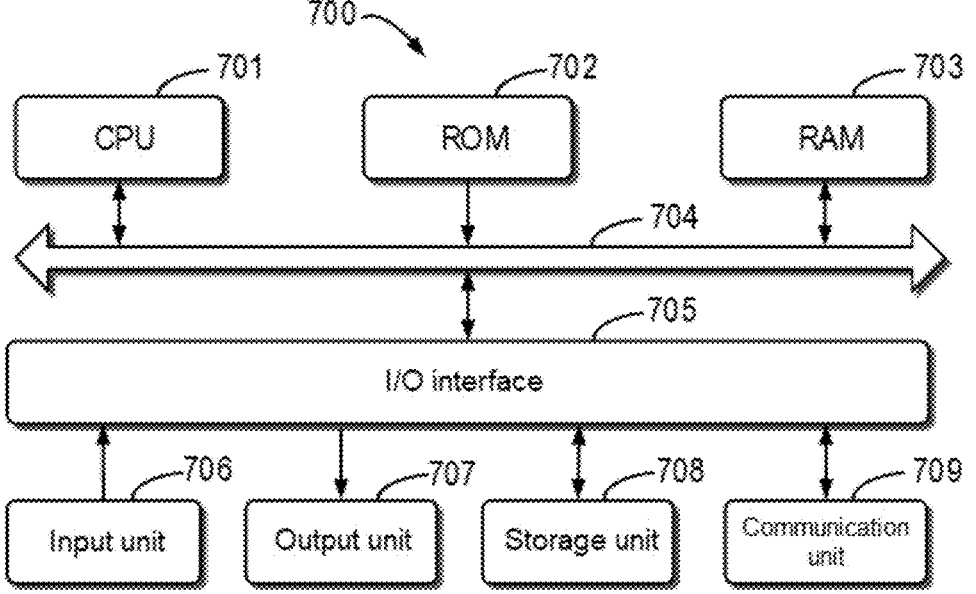
FIG. 7 shows a schematic block diagram of example device 700 that may be used to implement embodiments of the present disclosure.

FIG. 7 illustrates a schematic block diagram of example device 700 that may be used to implement embodiments of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. I/O interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above (such as method 300 and method 400) may be performed by processing unit 701. For example, in some embodiments, methods 300 and 400 may be implemented as a computer software program that is tangibly included in a machine-readable medium (such as storage unit 708). In some embodiments, part or all of the computer program may be loaded and/or installed onto device 700 via ROM 702 and/or communication unit 709. When the computer program is loaded into RAM 703 and executed by CPU 701, one or more actions of methods 300 and 400 described above may be implemented.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the device (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A data backup method, comprising:
   determining, at a storage system, delta data based on previous data and current data of the storage system, the previous data comprising a previous data block set and the delta data comprising a delta data block set;
   determining, at the storage system, a delta data block subset in the delta data block set, the delta data block subset comprising delta data blocks having the same content as previous data blocks in the previous data block set;
   generating, at the storage system, delta index and delta reference information for a respective delta data block in the delta data block subset in response to determining the respective delta data block includes the same content as a previous data block in the previous data block set and is included in a frequently-used delta data block set, wherein the delta index information or the delta reference information includes a position in a backup storage system from which to obtain content of at least one of the delta data blocks in the delta data block subset;
   sending, via a network, the delta index information and the delta reference information associated with delta data blocks in the delta data block subset to the backup storage system;
   generating, at the storage system, further delta index and further delta reference information for a further delta data block subset comprising delta data blocks in the delta data block set other than the delta data block subset, wherein the further delta index and the further delta reference information indicates that at least one data block in the further delta data block subset is included in the frequently-used data block set and at least one data block in the further delta data block subset is a non-frequently-used data block; and
   sending, to the backup storage system, the further delta data block subset and the further delta index and the further delta reference information.

2. The method according to claim 1, wherein determining the delta data block subset comprises:
   determining, based on the number of previous data blocks in the previous data block set which have the same content as particular delta data blocks in the delta data block set, the particular delta data blocks as delta data blocks in the delta data block subset.

3. The method according to claim 1, wherein sending the further delta data block subset to the backup storage system comprises:
   sending delta index information associated with delta data blocks in the further delta data block subset to the backup storage system.

4. The method according to claim 1, wherein the previous data is initial data of the storage system, the initial data comprises an initial data block set, and the method further comprises:
   sending the initial data block set and initial index information associated with initial data blocks in the initial data block set to the backup storage system.

5. The method according to claim 1, wherein the previous data is initial data of the storage system, the initial data comprises an initial data block set, and the method further comprises:
   sending an initial data block subset in the initial data block set and initial index information associated with initial data blocks in the initial data block subset to the backup storage system, the initial data blocks in the initial data block subset having different contents.

6. The method according to claim 5, further comprising:
   sending initial reference information associated with data blocks having the same content in the initial data block set to the backup storage system.

7. The method according to claim 1, further comprising:
   determining the at least one data block in the further delta data block subset included in the frequently-used data block set based on a correspondence of the at least one data block in the further delta data block subset with a plurality of items in the delta data.

8. A data backup method, comprising:
   receiving, via a network at a backup storage system, delta index information and delta reference information associated with delta data blocks in a delta data block subset from a storage system, the delta data comprising a delta data block set, the delta data block set comprising the delta data block subset, the delta data being determined at the storage system based on previous data and current data of the storage system, the previous data comprising a previous data block set, and the delta data block subset comprising delta data blocks included in a remote frequently-used delta data block set and having the same content as previous data blocks in the previous data block set, the delta index and delta reference information comprising a position in the backup storage system from which to obtain content of at least one of the delta data blocks in the delta data block subset, wherein a respective delta data block in the delta data block subset includes the same content as a previous data block in the previous data block set;

obtaining content of at least one of the delta data blocks in the delta data block subset based on the position included in the delta index information or the delta reference information;

receiving a further delta data block subset and a further delta data block set and a further delta reference information for the further delta data block subset, the further delta data block set comprising delta data blocks in the delta data block set other than the delta data block subset from the storage system, wherein the further delta index and the further delta reference information indicates that at least one data block in the further delta data block subset is included in the remote frequently-used data block set and at least one data block in the further delta data block subset is a non-frequently-used data block; and storing the at least one data block in the further delta data block subset included in the frequently-used data block set in a local frequently-used data block set based on the further delta data block set and the further delta reference information.

9. The method according to claim 8, wherein receiving the further delta data block subset from the storage system comprises:

receiving delta index information associated with delta data blocks in the further delta data block subset from the storage system.

10. The method according to claim 8, wherein the previous data is initial data of the storage system, the initial data comprises an initial data block set, and the method further comprises:

receiving the initial data block set and initial index information associated with initial data blocks in the initial data block set from the storage system.

11. The method according to claim 8, wherein the previous data is initial data of the storage system, the initial data comprises an initial data block set, and the method further comprises:

receiving an initial data block subset in the initial data block set and initial index information associated with initial data blocks in the initial data block subset from the storage system, the initial data blocks in the initial data block subset having different contents.

12. The method according to claim 11, further comprising:

receiving initial reference information associated with data blocks having the same content in the initial data block set from the storage system.

13. The method according to claim 12, further comprising:

generating backup data corresponding to the initial data based on the initial data block subset, the initial index information, and the initial reference information.

14. The method according to claim 11, further comprising:

if determining that data blocks in the storage system associated with index information in the delta index information and the initial index information are deleted, deleting the index information.

15. The method according to claim 11, further comprising:

receiving further delta index information associated with a further delta data block; and if determining that the further delta index information is the same as index information that has been received in the delta index information and the initial index information, increasing a count associated with the index information.

16. The method according to claim 15, further comprising:

receiving further delta reference information associated with the further delta data block; and increasing the count associated with the index information comprises:

increasing the count associated with the index information based on the number of references to the further delta data block indicated by the further delta reference information.

17. A data backup device, comprising:

at least one processing unit; and at least one memory coupled to the at least one processing unit and storing instructions for execution by the at least one processing unit, wherein the instructions, when executed by the at least one processing unit, cause the device to perform actions comprising:

determining, at a storage system, delta data based on previous data and current data of a storage system, the previous data comprising a previous data block set and the delta data comprising a delta data block set;

determining, at the storage system, a delta data block subset in the delta data block set, the delta data block subset comprising delta data blocks having the same content as previous data blocks in the previous data block set;

generating, at the storage system, delta index and delta reference information for a respective delta data block in the delta data block subset in response to determining the respective delta data block includes the same content as a previous data block in the previous data block set and is included in a frequently-used delta data block set, wherein the delta index information or the delta reference information includes a position in a backup storage system from which to obtain content of at least one of the delta data blocks in the delta data block subset;

sending, via a network, the delta index information and the delta reference information associated with delta data blocks in the delta data block subset to the backup storage system;

generating, at the storage system, further delta index and further delta reference information for a further delta data block subset comprising delta data blocks in the delta data block set other than the delta data block subset, wherein the further delta index and the further delta reference information indicates that at least one data block in the further delta data block subset is included in the frequently-used data block set and at least one data block in the further delta data block subset is a non-frequently-used data block; and sending, to the backup storage system, the further delta data block subset and the further delta index and the further delta reference information.

18. The device according to claim 17, wherein determining the delta data block subset comprises:

determining, based on the number of previous data blocks in the previous data block set which have the same content as particular delta data blocks in the delta data block set, the particular delta data blocks as delta data blocks in the delta data block subset.

19. The device according to claim 17, wherein one delta data block in the delta data block subset has the same content as a plurality of previous data blocks in the previous data block set.

20. The device according to claim 17, wherein sending the further delta data block subset to the backup storage system comprises:

sending delta index information associated with delta data blocks in the further delta data block subset to the backup storage system.

\* \* \* \* \*